(12) United States Patent
Leiber et al.

(10) Patent No.: US 8,864,244 B2
(45) Date of Patent: Oct. 21, 2014

(54) BRAKE SYSTEM WITH ADAPTIVELY CONTROLLABLE BRAKE LINING CLEARANCE

(75) Inventors: Heinz Leiber, Oberriexingen (DE); Valentin Unterfrauner, München (DE)

(73) Assignee: Ipgate AG, Pfäffikon Sz (CH)

( * ) Notice: Subject to any disclaimer, the term of this patent is extended or adjusted under 35 U.S.C. 154(b) by 639 days.

(21) Appl. No.: 12/809,692

(22) PCT Filed: Dec. 22, 2008

(86) PCT No.: PCT/EP2008/011020
§ 371 (c)(1),
(2), (4) Date: Sep. 27, 2010

(87) PCT Pub. No.: WO2009/083216
PCT Pub. Date: Jul. 9, 2009

(65) Prior Publication Data
US 2011/0031072 A1    Feb. 10, 2011

(30) Foreign Application Priority Data

Dec. 21, 2007 (DE) .......................... 10 2007 062 839
Aug. 14, 2008 (DE) .......................... 10 2008 051 316

(51) Int. Cl.
*B60T 13/66* (2006.01)
*B60T 13/46* (2006.01)
(Continued)

(52) U.S. Cl.
CPC ............ *B60T 8/00* (2013.01); *F16D 55/22655* (2013.01); *B60T 8/4845* (2013.01); *B60T 8/32* (2013.01); *F16D 2127/02* (2013.01); *B60T 8/4266* (2013.01); *B60T 8/4077* (2013.01); *B60T 8/447* (2013.01); *B60T 13/745* (2013.01); *F16D 2129/08* (2013.01)
USPC ........... 303/4; 303/20; 303/113.1; 303/113.4; 303/114.1; 303/115.4; 303/122.08; 303/154; 303/162; 188/72.1; 188/71.9; 188/157; 188/181 A; 701/70

(58) Field of Classification Search
USPC ........... 188/72.3, 72.1, 72.2, 204 R; 303/154, 303/155
See application file for complete search history.

(56) References Cited

U.S. PATENT DOCUMENTS 4,776,641 A * 10/1988 Bulling .............................. 303/4
5,090,518 A * 2/1992 Schenk et al. ............... 188/72.1
(Continued)

FOREIGN PATENT DOCUMENTS

DE    2554627 A1    6/1977
DE    4418801 A1    12/1994
(Continued)

OTHER PUBLICATIONS

English language translation of International Search Report and Written Opinion issued in related International Application No. PCT/EP2008/011020.

*Primary Examiner* — Robert A Siconolfi
*Assistant Examiner* — San Aung
(74) *Attorney, Agent, or Firm* — Panitch Schwarze Belisario & Nadel LLP

(57) ABSTRACT

The invention relates to a hydraulic brake system comprising a master brake cylinder the at least one working chamber of which is connected to the wheel brakes of the vehicle via at least one hydraulic line, the brake piston of at least one wheel brake being adjustable by a negative pressure in the hydraulic lines to produce a brake clearance.

16 Claims, 6 Drawing Sheets

(51) Int. Cl.
*F16D 55/2265* (2006.01)
*B60T 8/48* (2006.01)
*B60T 8/32* (2006.01)
*B60T 8/00* (2006.01)
*B60T 8/42* (2006.01)
*B60T 8/40* (2006.01)
*B60T 8/44* (2006.01)
*B60T 13/74* (2006.01)
*F16D 127/02* (2012.01)
*F16D 129/08* (2012.01)

(56) References Cited

U.S. PATENT DOCUMENTS

| | | | |
|---|---|---|---|
| 5,743,600 A | 4/1998 | Yasuda et al. | |
| 2003/0125863 A1* | 7/2003 | Tamasho et al. | 701/70 |
| 2004/0112689 A1* | 6/2004 | Nakayama et al. | 188/71.9 |
| 2005/0082122 A1* | 4/2005 | Taylor et al. | 188/1.11 L |
| 2006/0290201 A1* | 12/2006 | Kawahara et al. | 303/162 |
| 2007/0216218 A1* | 9/2007 | Matsushita et al. | 303/20 |
| 2008/0265663 A1* | 10/2008 | Leach et al. | 303/10 |
| 2009/0115247 A1* | 5/2009 | Leiber et al. | 303/154 |
| 2010/0026083 A1 | 2/2010 | Leiber et al. | |

FOREIGN PATENT DOCUMENTS

| | | |
|---|---|---|
| DE | 19601434 A1 | 7/1997 |
| DE | 19916700 A1 | 10/2000 |
| DE | 102005003648 A1 | 8/2006 |
| DE | 102006059840 A1 | 6/2008 |
| DE | 102007062839 A1 | 6/2009 |
| EP | 0436926 A2 | 7/1991 |
| EP | 0703133 A2 | 3/1996 |
| JP | 2000326838 A | 11/2000 |
| JP | 2002347598 A | 12/2002 |
| JP | 2005088612 A | 4/2005 |
| JP | 2005247230 A | 9/2005 |
| WO | WO-2006111393 A1 | 10/2006 |

* cited by examiner

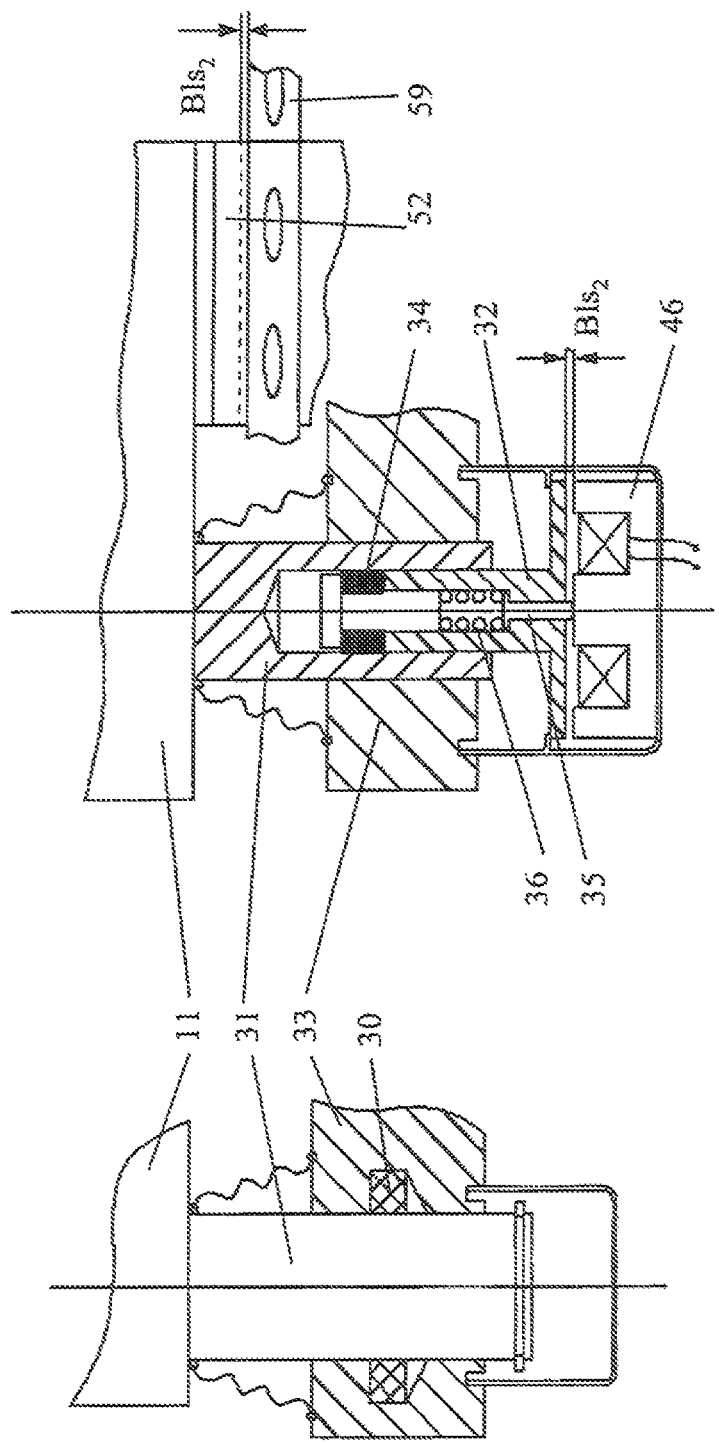

BRAKE SYSTEM WITH ADAPTIVELY CONTROLLABLE BRAKE LINING CLEARANCE

CROSS-REFERENCE TO RELATED APPLICATIONS

This application is a 35 U.S.C. §371 National Stage Application of International Application No. PCT/EP2008/011020, filed Dec. 22, 2008, which claims the benefit of German Patent Application No. 102007062839.2, filed Dec. 21, 2007 and German Application No. 102008051316.4, filed Aug. 14, 2008, the entire contents of which are incorporated herein by reference in their entireties.

The invention relates to a hydraulically acting brake system having a master brake cylinder, the at least one working chamber of which is connected to the wheel brakes of the vehicle via at least one hydraulic line.

After a braking operation, in particular in the case of brake systems having disc brakes, a residual braking effect develops since the restoring forces on the brake piston are not sufficient to lift the brake linings far enough away from the brake disc. In order to solve this problem, a roll back seal, amongst other things, was developed which moves the brake piston and with this the brake lining away from the brake disc upon completion of the braking operation. However, the roll back capacity of the sealing ring is limited to the brake piston and is not sufficient to fully compensate for any contamination, ageing or elastic deformation in the brake caliper and friction linings. Correctives having an air gap between the brake lining and the brake disc/brake piston are described in DE 44 18 801 and DE 196 01 434. The suggested solutions according to the documents mentioned above have so far not been introduced, since the additional expenditure in relation to the effect is unsatisfactory and, in addition, a pedal travel loss occurs during the subsequent braking as a result of the brake clearance set, as a result of which the braking distances in the case of a full braking operation become disadvantageously longer.

According to the current state of development of brakes, middle-class vehicles show on a test stand for determining the NEDC consumption, an additional consumption of approximately 0.251=6 g $CO_2$/km as a result of the above-mentioned residual braking effect. This figure applies to a new vehicle without any ageing effects and is considerable in consideration of future $CO_2$ targets.

It is therefore the object of the present invention to develop a hydraulically acting brake system further in such a way that any residual braking effect is certain to be avoided.

According to the invention, this object is achieved by means of the fact that a brake clearance may be generated and/or adjusted by means of negative pressure in the hydraulic supply line of a wheel brake. Further advantageous embodiments of the brake system according to the invention in accordance with claim 1 are obtained by means of the features of the dependent claims.

The invention is based on the concept of actively resetting the brake piston of a wheel brake by means of a negative pressure, wherein in particular via the magnitude of the negative pressure and the duration thereof a defined adjustment of the piston, and as a result of the brake lining or the brake linings, may be carried out in order to achieve a defined brake clearance.

In a first embodiment of the invention, the negative pressure may be generated using the master brake cylinder. If the drive of the master brake cylinder does not work sufficiently fast, an additional unit for generating negative pressure may be provided according to a second embodiment of the invention, which is in communication with the hydraulic supply line of the respective wheel brake.

For both embodiments described above, advantageously at least one valve may be provided, which is or are disposed between the reservoir for the hydraulic media and the master brake cylinder and/or the unit for generating negative pressure and the master brake cylinder. By means of this at least one valve, a flow of hydraulic media into the supply line or the master brake cylinder or the unit from the reservoir during generation of negative pressure is prevented.

Advantageously, the invention provides a simple solution for hydraulic brake systems, which allows a defined brake clearance to be achieved and which is capable of being diagnosed and which is also adaptive. Advantageously, the solution according to the invention may be used both for electro-pneumatic and electro-hydraulic brake systems.

In the brake system according to the invention, the brake clearance may advantageously be adaptively adjusted as a function of the driving condition of the vehicle.

According to the first embodiment, in order to adjust the required brake clearance, a negative pressure is generated behind the brake piston of a wheel brake upon completion of the braking operation by means of a certain control of the tandem master brake cylinder (THZ), as a result of which the brake piston is correspondingly moved and the brake clearance obtained. For a defined adjustment of the brake piston of the wheel brake, the adjustment travel and optionally the pressure of the THZ may be evaluated, since in the case of a relatively slow adjustment of the THZ, the brake piston travel follows the piston of the THZ and the ratio between the piston surfaces of the brake and the THZ piston may be used to determine the brake clearance via the THZ travel. By means of this it may be ensured that, as a result of a corresponding brake clearance of approximately 0.1 mm, only a small residual braking effect is present, predominantly as a result of the friction in the brake lining guide in the floating brake caliper and the floating brake caliper support.

In any case, the main component of the brake piston is no longer required. In some brake caliper designs, the brake lining is coupled to the brake piston via a spring, so that here only some minor friction acts in the floating brake caliper guide.

In order to ensure in the case of brake systems having a floating brake caliper that the brake clearance is obtained also on the brake lining present on the side of the brake disc, which faces away from the brake piston, a small brake caliper clearance is generated according to a further embodiment of the invention, so that no further residual braking effect occurs. To this end, in a first alternative, the floating brake caliper is moved back by means of a passive roll back element, which works in a similar way to a roll back seal known from the prior art, in order to generate a clearance for the brake lining fixed to the floating brake caliper upon completion of the braking operation. Here, the roll back element may advantageously act between the brake holder and the floating brake caliper guiding pin. In a second alternative embodiment, the floating brake caliper is actively moved by an actuator in order to adjust the brake clearance. The actuator may advantageously be an electromagnetic drive such as a magnet or an actuating motor.

Of course it is possible for the brake clearance to be adjusted on all the wheel brakes at the same time, successively or in groups. Provided the generation of the negative pressure can be carried out fast enough, it is advantageous if the clearance is controlled or adjusted individually for each wheel brake, i.e. one after the other. This is in particular possible in the case of an electro-hydraulic brake system.

The brake clearance should not and can not be constantly present during the operation of the vehicle. Thus, in rainy conditions the brake linings have to be in slight contact or, prior to the beginning of the braking operation upon the return of the accelerator pedal, even in greater contact. Also, the brake linings have to be briefly applied during longer periods of driving without braking on a dry road for the purpose of cleaning the discs, which in the case of the braking system according to the invention may be carried cut with a pre-defined minor brake force. For this reason it is necessary for the brake clearance to be adaptively adjustable. It is also advantageous if no brake clearance is adjusted when the vehicle stands still, for example when parking.

If a brake clearance was adjusted, this may mean an additional travel loss or a longer response time during braking, which, depending on the actuation speed of the brake, may result in a longer braking distance. In the case of a full braking operation to avoid a collision, this may be at the cost of essential meters in distance and may lead to an accident. In order to avoid an extension of the braking distance, the invention provides for applying the brake shoes to the brake discs prior to the beginning of brake actuation, i.e. in order to eliminate the brake clearance. Thus, the brake system has to detect when and if a brake actuation will take place. To this end, it would be expedient to drive the brake shoes with a smaller brake force when the accelerator pedal is taken back faster or alternatively to control this via a sensor for the distance between the foot and the brake pedal. It is also possible to use the signal or the data from a distance measurement system determining the distance to a vehicle or obstacle in front, in order to determine an imminent braking operation. Similarly, the vehicle speed may be taken into consideration during the evaluation.

In the brake system, in particular in an electro-hydraulic system, the volume fed by the master brake cylinder, in particular the THZ, for applying the brake linings and for reducing the brake clearance, has to be replenished by means of the master brake cylinder returning back into the normal position upon application of the brake linings and by compensating the volume via the expansion ports of the master brake cylinder. This process only takes <50 ms and is completed before the foot of the person driving the vehicle touches the brake pedal.

Advantageously, all of the functions of the brake system according to the invention may be fully diagnosed. For example, by means of a corresponding master brake cylinder control, the brake clearance may be tested whilst the brake piston is in contact with the brake lining, in particular when the vehicle is stationary.

Advantageously, the invention allows a brake lining wear sensor to be dispensed with. To this end, whilst the vehicle is stationary, preferably in the parked position, the brake piston is returned back into its home position by means of the above-mentioned drive and is subsequently advanced again into contact with the brake disc. The additional advantage is that wear may be extrapolated during corresponding diagnostics intervals and will be recorded in the vehicle diagnostics system. Therefore, the additional expenditure during vehicle inspection, e.g. for taking the wheels off in order to view the lining wear, may be eliminated.

The suggested solution advantageously allows a defined brake clearance having, if any, only a very minor residual braking effect and thus a considerable reduction in $CO_2$. In addition, the brake system according to the invention may be fully diagnosed and does not need and improves brake lining wear indication as an essential safety function. This solution is also very cost-effective.

The above described second embodiment is suitable for a quick market launch, since it represents an add-on solution to pre-existing ABS/ESP concepts having a vacuum enhancer, wherein an electromotoric suction pressure unit having switching valves may be added to pre-existing tandem master brake cylinders including a vacuum brake power assist unit and in addition enables brake clearance control using the ABS inlet valve with the same distributor for the individual wheel brakes. This additional expenditure, except for the switching valves, will be eliminated in the case of a market launch of the electromotoric brake power assist unit according to DE 10 2005 018 649.

DE102007062839.2 describes re-feed chambers which introduce an additional volume as required into the brake circuits in extreme cases such as fading and a high pressure and volume demand.

The re-feed chamber may also be used for a further function, namely for adjusting brake lining clearance. In the case of the above-mentioned solutions, the control of pistons and valve clearances is very complex, if the piston cannot be returned from the initial position, since this means additional design expenditure in the case of the electromotoric brake power assist unit. This, however, is made simple with the re-feed chamber, because a corresponding volume is briefly moved, back from the HZ piston, in order to generate the negative pressure in preferably one wheel cylinder. The remaining wheel cylinders will be served one after the other. In the course of this, a brake clearance may be obtained in the wheel cylinders during measurement of the negative pressure via the pressure transducer and a corresponding travel control of the push-rod piston. This brake clearance may again be eliminated at any time during or also prior to a braking operation. Thus, on the basis of an external signal, it is possible to bring the brake linings back into contact with the brake disc as early as prior to the beginning of the braking operation. As a result of this so-called pre-filling, the braking distance may be reduced, in particular if the pre-filling pressure has already reached a pressure level of 5 bar.

The two possible embodiments of the invention as well as any control concepts will be explained in more detail below with reference to the drawings, wherein:

FIG. 6 shows a first alternative having a roll back element as a floating brake caliper;

FIG. 7 shows a second alternative having an actuator for adjusting the floating brake caliper in order to adjust a clearance for the brake lining, which is disposed on that side of the brake disc, which faces away from the brake piston;

Figure 1:
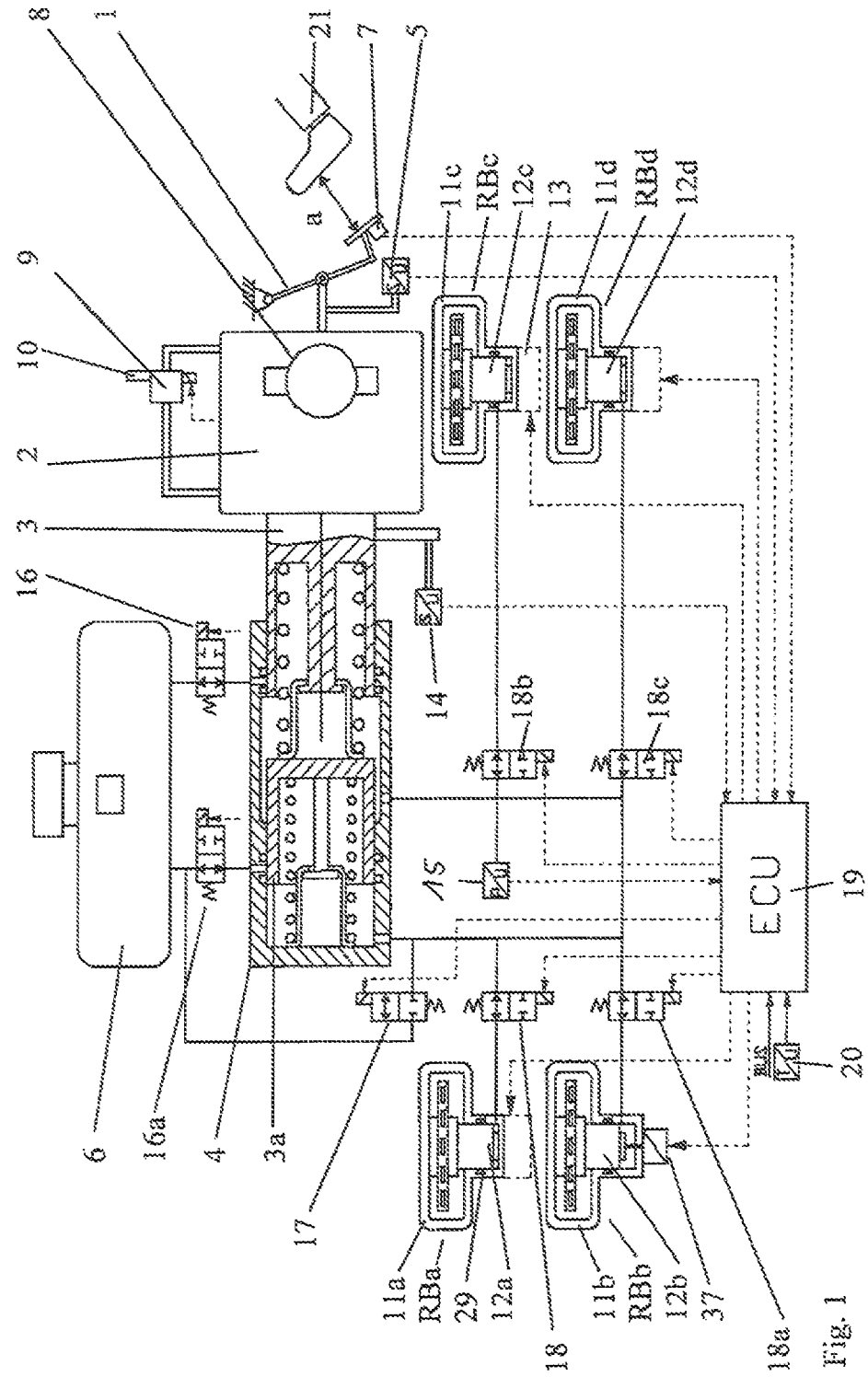
FIG. 1 shows a first embodiment of the invention.

FIG. 1 shows a brake system having control valves 18, 18a, 18b, 18c, as is described in essence in DE 10 2005 018 649; to which reference is herewith made with regard to the remaining disclosure thereof. The brake system comprises, amongst other things, the electromotoric brake power assist unit (BKV) 2, 8 having a tandem master brake cylinder (THZ) 4 as well as the push-rod piston (DK) 3 and floating piston (SK) 3a thereof, the brake pedal 1, the pedal travel transducer 5, the control valves 18 to 18c, the switching valves 16, 16a and 17, the pressure transducer 15, the wheel brakes RBa to RBd and the reservoir (ECU) 19. As is described in DE 10 2005 018 649, the brake system combines the brake power assist unit with the pressure modulating units ABS and ESP.

The present invention extends the brake system of DE 10 2005 018 649 by the active adjustment of a brake clearance in the individual wheel brakes.

If the vehicle after braking is accelerated using the accelerator pedal (not shown) or the speed control unit or is driven at a constant speed, in the most basic embodiment of the invention or the control thereof the switching valves 16 and 16a are closed so that the THZ 4 is isolated from the reservoir 6. Subsequently, the DK piston 3 of the THZ 4 is returned by means of the electromotoric drive from the normal position, as a result of which a negative pressure is generated in the working chamber and the hydraulic lines. If now, for example, the brake piston 12c of the wheel brake RBc is supposed to be moved by the negative pressure, the control valve 18b has to be opened and the control valves 18, 18a, 18c, which are associated with the remaining wheel brakes, have to be closed. As long as the DK piston 3 continues moving, the brake piston 12c of the wheel brake RBc is moved back with the valve 18b open. From the area ratio between the brake piston 12c and the DK piston 3, assuming a brake clearance to be adjusted of for example 0.1 mm, the necessary adjustment movement of the DK piston 3 is obtained, if the movement is carried out at a slow rate relative to the pressure modulation for ABS and no dynamic influential factors exist.

The movement of the DK piston 3 may also be monitored by means of the pressure curve using the sensor 15. For controlling the brake clearance, an accuracy of 40% is sufficient. As a result of the contact pressing force of the brake piston being eliminated, also the resulting force on the brake lining or the bearing force thereof on the brake holder (not shown) is reduced. In many brake caliper designs, the brake lining is connected to the brake piston or also to the floating brake caliper by means of detent springs, so that a resetting of the brake piston automatically eliminates any residual braking effect on the brake lining. Also the support forces in the guiding pins (not shown) of the floating brake caliper are reduced, so that ultimately, only a very minor residual braking effect will remain. FIGS. 2 to 5 show the time courses of the brake clearance control in more detail.

In the shown position of the THZ DK piston 3 and the SK piston 4, the so-called expansion ports for post-suction of brake fluid from the reservoir 6 are opened. This position is referred to as the normal position. Moving the DK piston 3 back from this normal position against the normal actuation direction requires some design effort. As an alternative it would be possible, via a corresponding advance movement of the DK piston 3, to apply a minor pressure onto two brake pistons of a brake circuit, subsequently to move back only a first brake piston using negative pressure, as a result of which a brake clearance larger than necessary will be set. In the meantime, the other second brake piston will remain in its position on account of the control valve associated therewith being closed. Subsequently, the first brake piston is moved by means of a corresponding DK piston movement to a smaller brake clearance position, and subsequently the second brake piston is again controlled via a DK piston return movement to the corresponding brake clearance. Whilst pressure is being applied, i.e. during the valve movement out of the normal position at a low pressure level, for example the control valves 18b and 18c of the brake circuit supplied by the DK piston 3 are open. Also, the switching valves 16 and 16a are open. During the return movement of the DK piston 3, the switching valve 16 and a control valve, e.g. 18c, are closed, and the brake piston 12c is moved to a double brake clearance position. Subsequently, the DK piston 3 will remain in the "normal position" when the switching valve 16 is open and the control, valve 18b is also open. In the course of this, the brake piston 12d will move into its initial position without any brake clearance. In the next step, with the valves 16 and 18b open, the brake piston 12c is set to normal brake clearance by means of a corresponding DK piston movement. Here, the control valve 18c is closed. Subsequently, the switching valve 16 and the control valve 18b are closed and the DK piston return movement is activated whilst the control valve 18c is open. In the course of this, the clearance on the second brake piston 12d is adjusted. After that, the piston returns to its normal position with the control valve 18c closed and the switching valve 16 open. In the normal position, all of the valves are open.

A further control possibility to avoid the return movement from the normal position consists, similar to the one described above, in moving the DK piston 3 from the normal position whilst applying a low pressure level to both pressure pistons 12c and 12d with the valves open. Subsequently, the DK piston 3 is moved back with the switching valve 16 closed and the control valve 18b open, until the brake clearance in the piston 12c has been reached. Subsequently, the control valve 18b is closed and the control valve 18c is open and the DK piston 3 is moved further again until the clearance is achieved in the brake piston 12d. After that, the control valve 18c is also closed and the DK piston 3 moves back into the normal position with the switching valve 16 open. Once the normal position has been reached, all of the valves that are not open will be re-opened. This control has been shown to be the easiest one to implement.

There are various possibilities for controlling the clearance of the brake pistons. Another one consists in disposing a switching valve 17 in the primary circuit in the connection between THZ 4 and the wheel brakes. In order to control the clearance, a small amount of pressure is generated in the corresponding brake circuit in both wheel brakes. A return movement of DK piston 3 and SK piston 3a will result in a negative pressure with the control valve 18 open and the control valves e.g. 18a, 18b and 18c closed, in the brake piston 12a of the brake RBa. This may be detected by means of the pressure transducer 15. A corresponding piston movement from the DK piston 3, which may be determined by using the sensor 14, will result in the desired clearance in the wheel brake RBa, in a manner similar to the above-mentioned examples. The stroke sensor 14 may be replaced by the customary angle of rotation detector (not shown) of the EC motor of the BKV 8. At considerable extra expenditure, the clearance on the brake piston may be measured or controlled directly by means of a sensor 37 disposed on the wheel brake.

The generation of a defined brake clearance on all of the four wheel brakes will result in an additional volume during brake actuation, i.e. an additional pedal travel, which in turn leads to a deterioration of the response time which means, in the case of an emergency brake operation, an extension of the braking distance. This volume compensation may be carried out by means of a corresponding control using a rapid brake power assist unit BKV 2 with the THZ 4 prior to brake actuation. This process will be described with reference to FIG. 4. This volume compensation control may be initiated if the acceleration pedal is returned quickly. However, this solution will not work with vehicles having a speed control unit, where the foot does not always need to be on the accelerator pedal. Here, for example, a simple distance sensor 7 may be provided on the brake pedal 1, which measures the response distance a as the foot approaches the brake pedal. If the distance falls under certain value, for example, the start of volume compensation may be initiated.

The brake clearance should not operate particularly in rainy conditions. Rainfall or a wet road surface may be signalled to the brake system, for example, by means of the drive signal for the windscreen wipers, which is fed to the ECU 19 via the bus. Similarly, it is possible to use, for example, the signal from a rain sensor. Here, in addition to the criteria mentioned above, the brake disc may be freely braked at an elevated pressure of <5 bar shortly before the brake operation. During prolonged travel on a dry road surface without brake actuation, the disc tray be cleaned within a brief period of time by applying the brake linings.

The brake clearance may also be eliminated in the parking position or at low speeds. The same may apply to low temperatures, which may be supplied by the ECU 19 by means of a temperature sensor in the engine compartment or the existing outside temperature sensors.

Figure 1A:
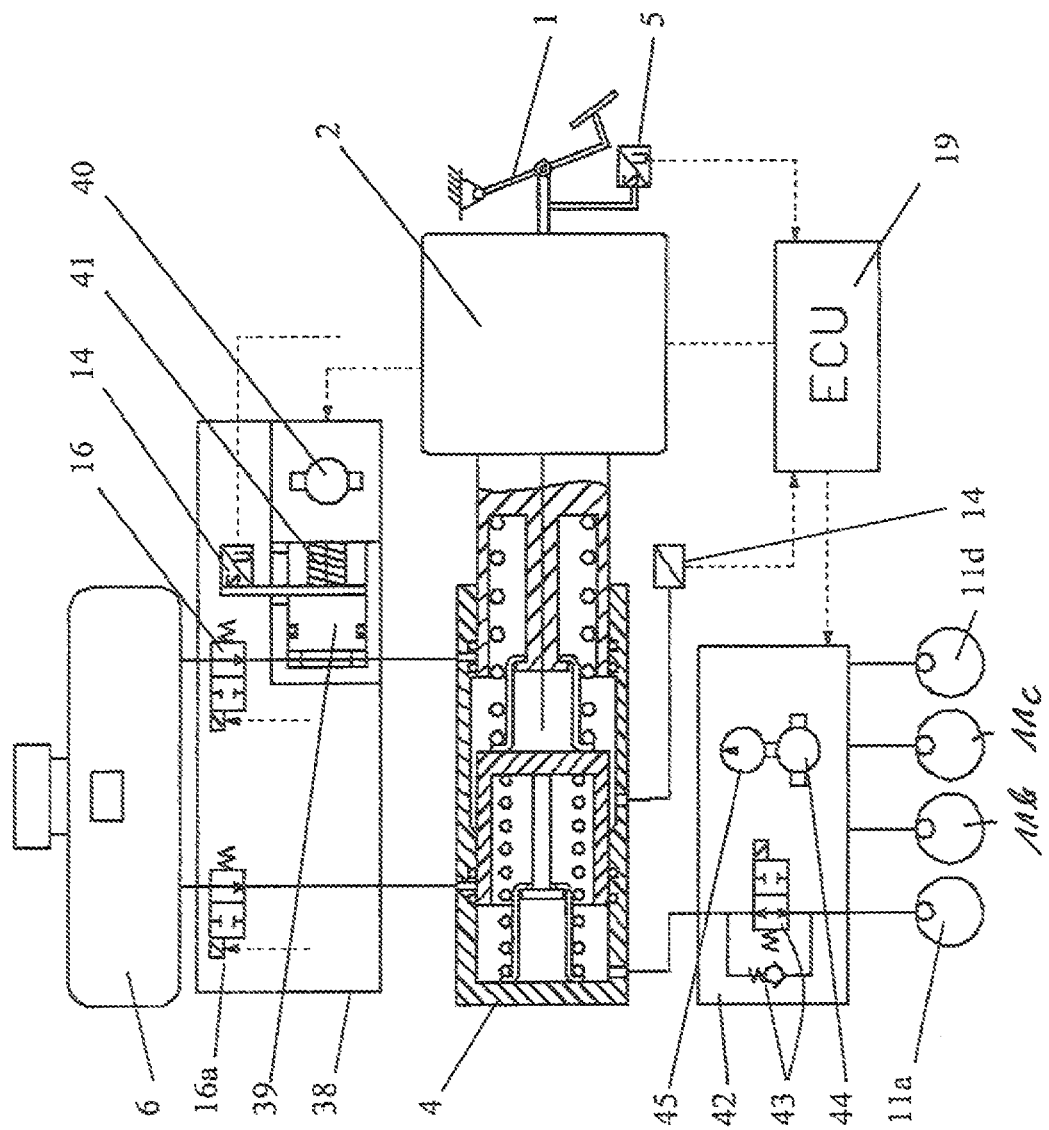
FIG. 1a shows a second alternative embodiment of the invention having an additional piston cylinder unit.

As an alternative to the preferred electromotoric brake power assist unit, a vacuum or hydraulic brake power assist unit may be used, as a result of which additional switching valves 9 and the pressure supply line 10 will be required. According to the present state of the art, however, the dynamics of these assist units are not sufficient to carry cut a sufficiently fast control of the brake clearance and volume compensation. For these brake power assist units, an add-on solution is suggested in FIG. 1*a*. This consists of the switching valves 16 and 16*a* as already described above and a suction pressure controller 36, comprising the piston 49, the shaft 41 having an electromotive drive 40, as well as a travel sensor 14. Instead of this travel sensor 14, the integrated angle of rotation sensor integrated therein may be used, if an electric motor is used. As an alternative to the electric motor, a linear magnet may also be used, since the required performance for achieving the necessary negative pressure is not very high. If now the brake clearance, for example in the wheel brake 11*a*, is supposed to be adjusted, all of the electric valves (not shown) with the electric motor 44 and the pump 45 of the ABS/ESP HCU (Hydraulic Computing Unit) 42 are closed. Also, the switching valves 16 and 16*a* are closed. The piston 39 moves back a predetermined distance, as was already described in connection with the tandem master brake cylinder, with the electric valve 43 being open. Here, too, the process may be monitored via the pressure transducer 14. Once the brake clearance is set, the electric valve 43 closes. The piston 39 continues to move back and successively adjusts the required brake clearance in the remaining wheel brakes 11*b* to 11*d*. After that, the piston 39 stops, the switching valves and all of the electric valves are opened. If now the brake clearance is supposed to be switched off or a braking operation is initiated, a rapid displacement of the piston 39 into the initial position is carried out. In the course of this, the switching valves 16 and 16*a* are closed. As a result of this, volume compensation is carried out prior to the braking operation, and the response characteristic of the brake is not affected. The pressure level is in the order of <2 bar, as a result of which the adjustment performance and the design effort as well as the weight will be low. The pressure transducer 15 is present in each ESP system and needs to be extended if necessary in the measurement range for the negative pressure.

Figure 2:
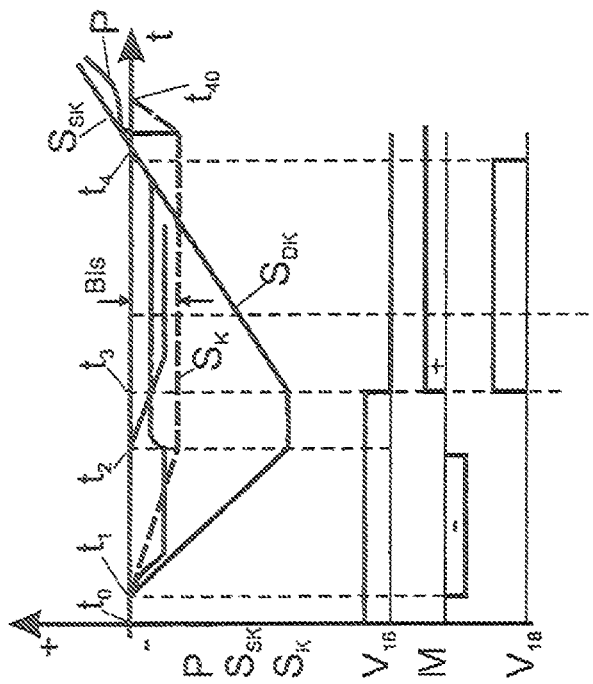
FIG. 2 shows a control process for adjusting a brake clearance.

FIG. 2 shows the control timing for adjusting a brake clearance corresponding to the basic control. The diagram shows the piston travels and the pressure behind the brake piston. $S_K$ indicates the travel-time course of the respective brake piston, $S_{DK}$ indicates the travel-time course of the DK piston 3, p identifies the pressure behind the brake piston and BLS identifies the size of the brake clearance. V16 and V18 identify the positions of valves 16 and 18. Graph M indicates the direction of movement for the adjustment of the DK piston 3. At the time $t_0$, the switching valves 16/16*a* are actuated, and at $t_1$ the motor is driven for returning the DK piston 3 from the normal position, in which the expansion ports are open. Both switching points $t_0$ and $t_1$ may also coincide. As the DK piston 3 moves backwards, the negative pressure p increases, and once a certain value is exceeded the brake piston $S_K$ will be moved. During the movement of DK piston 3 and brake piston $S_K$, the pressure remains approximately constant and far below the limit value of −1 bar to indicate that the piston is moving. A full or maximum negative pressure would be an indication that the piston is not moving or is jammed. At the time $t_2$, the target value of BLS over the described correlation between the piston, surface area and the corresponding travel is reached by $S_K$ and $S_{DK}$. At the end of the $S_K$ movement, the negative pressure is reduced. Up to $t_3$, no further movement takes place. After chat, the DK piston 3 is moved into the normal position, which is reached at the time $t_4$. During DK piston movement, the control valve 18 remains closed and the switching valves 16 and 16*a* are opened for pressure compensation.

At $t_4$, the control valve 18 is opened so that atmospheric pressure is present on both sides of the brake piston. After $t_4$, the brake clearance may be reduced to zero by increasing the pressure. During further movement of the DK piston 3 from the normal position, the clearance may be determined from the pressure course and the $S_{DK}$ travel for re-application, whereby the brake clearance is diagnosed. What is essential is that the time duration of the negative pressure and the level thereof are low, in order to avoid any entrapped air escaping into the brake fluid. Therefore, at the time $t_4$, if there is no pressure increase, the DK piston 3 has to be in its normal position and the switching valves have to be open, so that a full pressure compensation acts on the brake pistons and they will stay in the clearance position. The friction forces of the roll back seal are relatively high. During this defined clearance control, also other seals may be used, which will improve the braking performance during minor braking delays.

Figure 3:
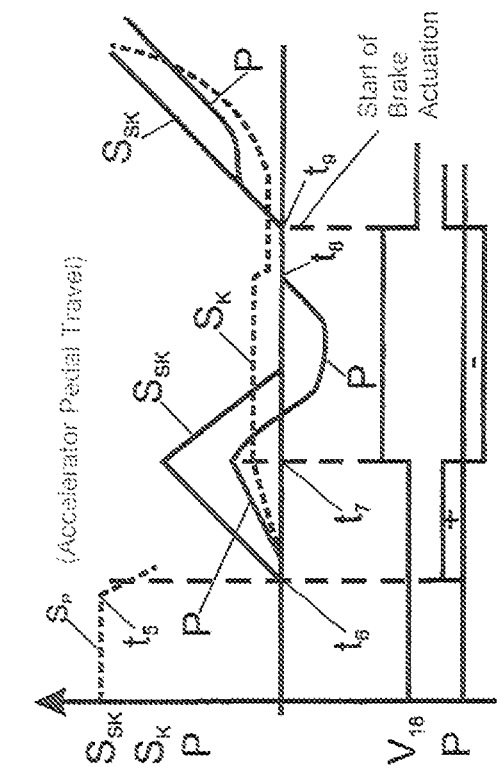
FIG. 3 shows a control process for eliminating the brake clearance prior to the initiation of a braking operation.

FIG. 3 describes the process of volume compensation control. At the time $t_5$, the accelerator pedal is quickly retracted, which leads, at the time $t_6$, to motor control and to a movement of the DK piston 3 and to the brake linings being re-applied after a corresponding $S_K$ travel. This has taken place at a time $t_7$, which would result in a pole reversal of the motor and to opening of the switching valves 16 and 16*a*. During this return movement, the control valves 18/18*c* are closed and, via collars of the HZ piston, the corresponding lack in volume in the HZ chambers is sucked in by the negative pressure. At the time $t_8$, pressure balance is restored again. At the time $t_9$, the brake may then be actuated again as normal, without any volume or pedal travel loss for a pressure build-up being present. Here, too, it is essential that this process is carried out quickly, e.g. within <50 ms.

Figure 4:
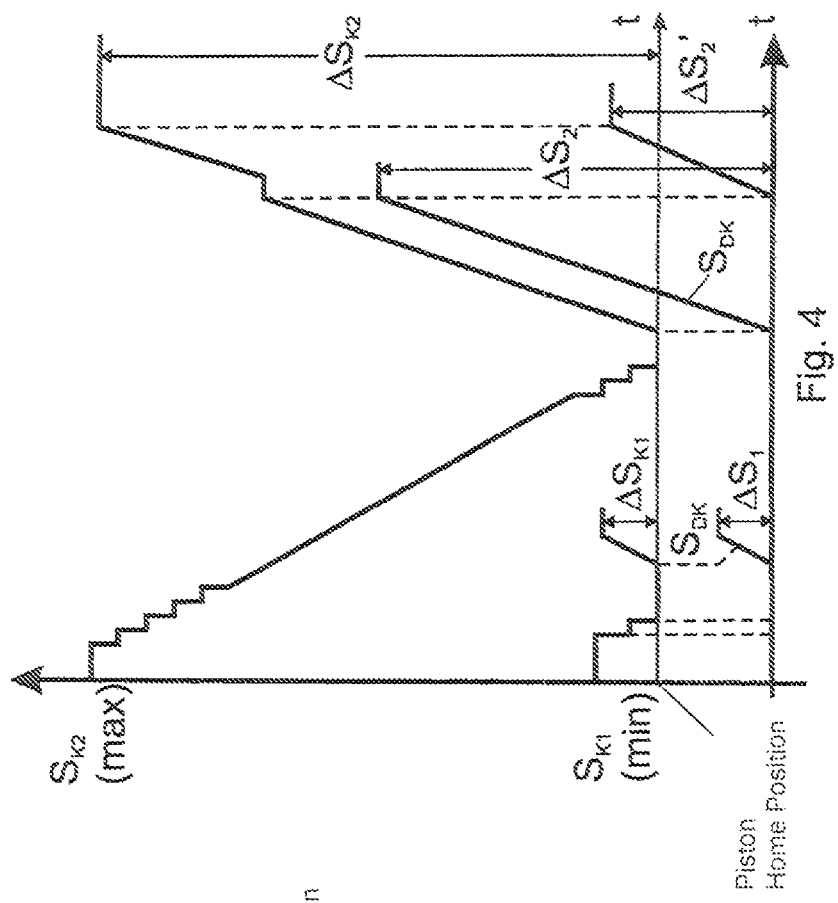
FIG. 4 shows a control process for determining brake lining wear.

FIG. 4 shows the control for determining brake lining wear. The ordinate shows the piston travel $S_K$ for $S_{K1}$ (min) and $S_{K2}$ (max) wear. The zigzag shape indicates the negative pressure intervals for moving the piston back into its initial position or back into its home position. This control process for the brake piston home position will be described in more detail with reference to FIG. 5. Once the brake piston rests in its home position, the movement is again carried out in the direction of contact with the brake disc. At minimum wear, this will have taken place after $\Delta S_{K1}$ or $\Delta S_1$ of the control piston. In the case of great wear, a full stroke of the HZ will not be sufficient so that the entire piston movement which is proportional to wear, may be determined in several stages $\Delta S2+\Delta S2'$. This test may also be carried out in greater intervals, e.g. every 10,000 km. The advantage is an extrapolation of the wear values, so that an expensive inspection during service may be dispensed with.

Figure 5:
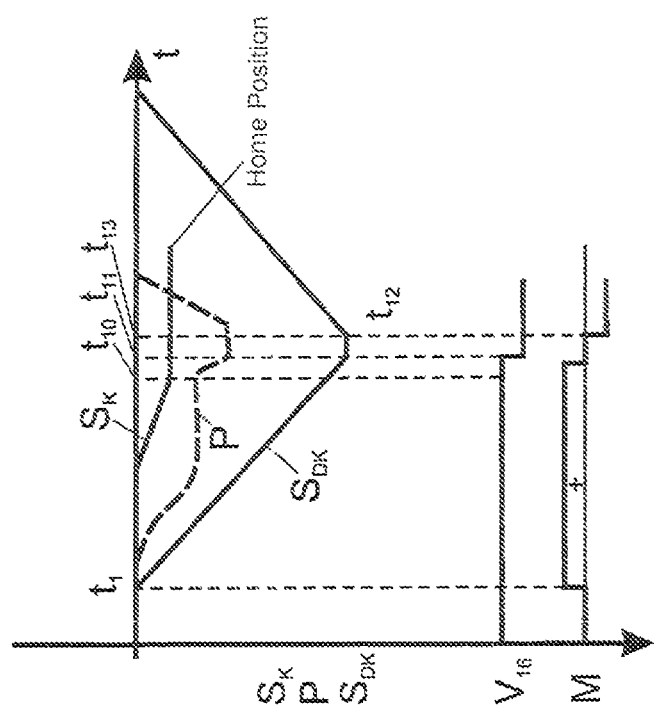
FIG. 5 shows a control process at minimal and maximal brake lining wear.

FIG. 5 shows the control process shortly before the brake piston reaches its home position. The first part after $t_1$ corresponds to the one already described in FIG. 3. At the time $t_{10}$, the negative pressure increases as soon as the piston reaches its home position, which is used as the basis for measuring brake lining wear. At the motor is switched off and the switching valve 16, 16a is closed. At $t_{12}$, the DK piston moves back into its initial position.

FIG. 6 shows a section from the floating brake caliper support having a brake holder 33, a brake caliper 11a and a guiding pin 31. It is suggested here to use a roll back element 30 for a clearance of the brake caliper, which at the end of the pressure application will generate not only a clearance on the brake piston but also a clearance on the brake caliper side. Thus, the remaining braking torque is almost zero, since the brake piston couples the brake lining using a spreading spring, thus creating a distance to the brake disc.

The object of the solution according to FIG. 7 is also to generate a clearance on the brake caliper side. Here, a magnet armature having a bearing pin 32 is provided with a spreading element 34, the friction of which is greater than the friction of the two guiding pins of the brake caliper. At the start of the braking operation, the magnet is energised by means of a coil and attracts the armature with the brake caliper 11. On the opposite side, the reaction force of the brake piston causes the brake caliper 11 to be pressed onto the brake disc via the brake lining 52 and thus generates the braking effect, as is well known. At the end of the braking operation, the magnet 46 is switched off and the return pin 35 including the compression spring 36 generates a defined brake clearance $BLS_2$ and thus causes the return of the brake caliper. As a result of the fact that at the beginning of the braking operation, similar to FIG. 1, the magnet is activated via a distance transducer to the brake pedal, this brake clearance $BLS_2$ does not result in an extension of the pedal travel.

Described above are a large number of feasible solutions enabling an adaptive control of the brake clearance for the purpose of keeping the braking effect as low as possible, as a result of which a large reduction in $CO_2$ and in fuel consumption is achieved. According to the inventive concept, a clearance may be specifically adjusted by means of the solutions according to the invention not only on the brake piston side, but also on the caliper side, so that the residual braking effect becomes almost zero.

Figure 8:
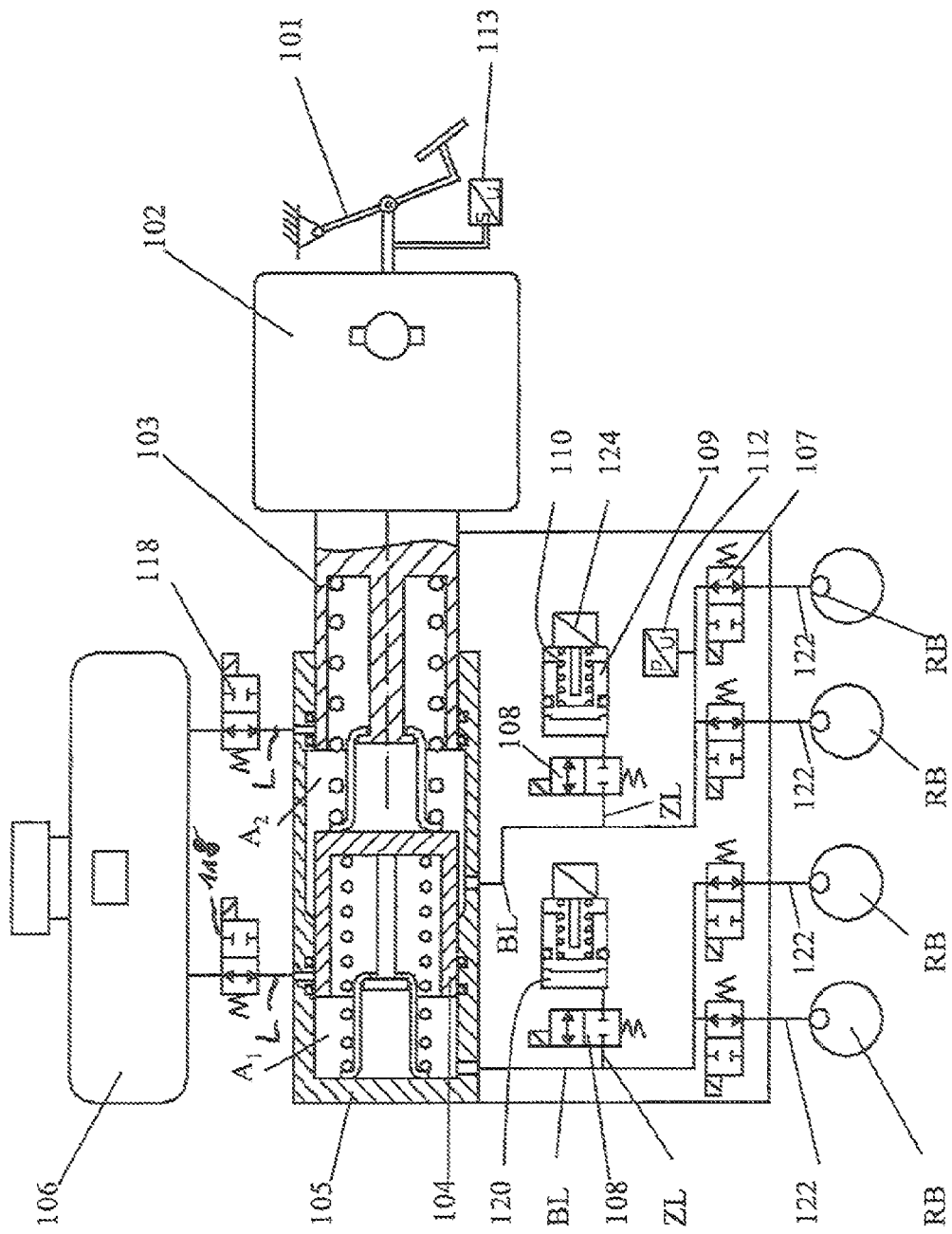
FIG. 8 shows a third alternative embodiment having means for re-feeding.

FIG. 8 shows the principal design of an electric motor BKV as described in DE 102005018649.19, DE 102006059840.7 and DE 102005003648, and the present application adopts the disclosure thereof in its entirety. With the BKV intact, the pedal is decoupled from the master brake cylinder Hz. The pedal force is received by the travel simulator (not shown), which generates a customary pedal feel. The pedal stroke sensor 113 detects the pedal stroke, which may be associated with a desired brake pressure via a characteristic curve. Thus, by actuating the brake pedal 101 the brake power assist unit 102 is activated, which acts on the push-rod piston 103 of the master brake cylinder 105. As a result of the volume displacement and the pressure, the floating piston 104 is moved. Both pistons 103 and 104 cause pressure to be generated in the respective brake circuits. The corresponding brake fluid is provided in the reservoir. For details about the construction of the known master brake cylinder, reference is made to DE 102005018649.19, DE 102006059840.7 and DE 102005003648. As is well known, pedal travel and piston travel may differ in travel simulator systems. In the case of braking operations with a high friction value, the piston runs ahead of the pedal. If now the piston 103, 104 reaches the stroke end area, the re-feeding process takes place. In the course of this, initially the control valves 107 are closed and the pressure reached is locked within the wheel brakes. Subsequently, the re-feeding valves 108 are opened. At the same time, the push-rod piston 103 is moved back by the electromotive BKV, as a result of which the pressure in the master brake cylinder reduces towards zero (0). The stored brake fluid will be delivered from the already filled re-feeding chambers 120 of the re-feed means F by means of the spring 110 and the piston 109 into the working chambers A1, A2 of the master brake cylinder. In the re-feeding chamber 120, positive pressure is preferably present, e.g. at 5 bar, so that the brake fluid is actively fed into the master brake cylinder. Subsequently, the re-feeding valves 108 are closed and the control valves 107 are opened. By means of a corresponding motor control, the brake fluid is now displaced into the brake circuits 122, as a result of which the pressure in the respective brake circuits 122 increases further as a function of the position of the valves 107. Thus, a further pressure increase is possible without the pistons 103 and 104 reaching the limit area (left-hand position). Optionally, it is also possible to re-feed only in one brake circuit 122. By means of a corresponding design of the piston surface area and the piston stroke, the volume missing in the Hz may be pre-stored in the re-feeding chamber 120, in order to cover for any extreme situations. As a result of the bias of the spring 110, the fill pressure amounts to e.g. 5 to 10 bar with a corresponding spring design. Together with a re-feeding valve 108 with a large opening cross section, a rapid re-feeding into the working chambers $A_1$, $A_2$ is thus enabled, e.g. within 50 ms, whereby any significant delay of pressure increase is avoided.

The re-feeding valves 108 should be optimised with regard to the flow and switching times. The valves 108, which are preferably designed to be closed when de-energised, may have a large valve seat cross section. By using a common coil, valve 108 may thus open only at average pressures of e.g. 50 bar. This is not of any disadvantage for re-feeding, since the re-feeding valves are switched at approximately 10 bar. Thus, no expensive pressure balanced valves are necessary for re-feeding. For time reasons it may also be expedient during re-feeding not to re-feed the entire volume in the re-feeding chamber 120 or the working chamber in one go. If, for example, the piston 103, 104 approaches the limit position at 140 bar, volume for a pressure build up to 170 bar may initially be re-fed. If the pressure is supposed to increase even further, the remaining volume for e.g. 200 bar of maximum pressure may be re-fed in a new re-feeding step. Since for the majority of cases the first re-feeding step is sufficient, it is thus possible to reduce the dead times during pressure build-up during the re-feeding process for these braking operations.

The re-feeding chamber 120 may be filled and diagnosed upon filling at the end of the line or during service, at each vehicle start or also during acceleration phases. To this end, preferably the maximum pressure is introduced, controlled at a pressure of approximately 10 bar, into the re-feeding chamber via the motor control. If now the re-feeding valve 108 is open, the push-rod piston 103 must not move. Should this however be the case, then this indicates a leak in the piston seal or a leaky re-feeding valve 108. The differential volume may be determined via the piston travel BK. From the differential volume and the diagnostics intervals the extent of the leakage may be determined. To this end, the re-feeding pressure in the master brake cylinder is controlled to be at its maximum. In addition, it may now be diagnosed whether the re-feeding valve 108 and/or the piston 109 is/are jammed. As soon as the re-feeding block 20 is re-filled, the piston 103 is retracted. On the basis of the course of the pressure-volume characteristic curve it may now be determined whether the re-feeding piston 109 moves as well and whether the re-feeding valve 108 has switched.

Alternatively, the filling condition of the re-feeding chamber 20 may be checked by closing the control valves 107, the maximum filling pressure of the re-feeding chamber 20 of e.g. 10 bar is set in the Hz, the piston position is controlled as the regulating variable, the re-feeding valves 108 are opened and the pressure sensor 112 is used to monitor whether the pressure in the Hz drops.

Thus, by adapting the re-feeding volume it is possible to use the same basic system for several vehicle classes. In the case of conventional solutions consisting of the Hz and a vacuum BKV, a different size needs to be used for each vehicle class, which results in additional logistics costs during production and repair.

Moreover, considerably lower pedal forces develop in the case of a failure of the brake power assist through the smaller piston diameters.

Since in the case of the travel simulator system, the ventilation condition of the brake system may be regularly checked via the pressure-volume characteristic curve, the overall volume of the brake actuation, consisting of the master brake cylinder volume and the re-feeding block displacement volume, may be altogether reduced compared to conventional systems. The additional safety volume for poorly ventilated volumes as is the case with conventional systems no longer has to be provided.

A further possibility for monitoring the filling condition of the re-feeding chamber 20 is the use of an optional sensor 24. This sensor detects the position of the piston 9. The sensor 24 may be designed as a travel resolution sensor or as a switch detecting a position of the piston 9. This sensor may be used for diagnostics or for a defined piston control, so that a sufficient volume may be provided for the function of generating negative pressure.

In order to adjust a lining clearance between the brake disc and the brake lining, a negative pressure is generated for a short period of time in the THZ 103, 104, 105. Thus, the brake pistons in the wheel brakes are actively retracted, as a result of which a distance between the brake lining and the brake disc is created. This results in the possibility of eliminating the residual friction effect between the brake linings and the brake disc. The re-feeding chamber 120 may be used for generating the negative pressure.

During normal operation, the re-feeding chambers 120 are not completely filled. They contain a sufficient volume, in order to be able to provide brake fluid for high pressure requirements, but without receiving any additional volume.

At the beginning of the lining clearance adjustment, the piston 103 is advanced via the motor drive 102. The piston 104 moves analogously thereto. With the re-feeding valves 108 open, the brake fluid is thus displaced into the only partially filled re-feeding chambers 120. Now, the solenoids 118 are closed and one of the control valves 107 is opened. The piston 103, which is still in its extended position, is retracted by the motor shaft drive a little way in the direction of the initial position. As a result, a negative pressure is generated which is transferred via the brake lines 122 onto the wheel brakes RB, the control valve 107 of which is open.

Now, the remaining three wheel brakes are retracted by sequentially opening the respective control valves. The travel of the piston 103 is, via the area ratio with the brake piston, proportional to its travel of the brake piston. In this phase, the negative pressure is evaluated, so that the piston movement will not be evaluated until the pressure has fallen below a certain value or pressure course. The term pressure course is to be understood to mean that, when the negative pressure is constant across the piston friction, this is equivalent to a movement of the brake piston. Subsequently, the solenoids 118 are opened again. Thus, the vacuum pressure in the THZ 105 is eliminated. It is the object of the solenoids 118 to prevent, during the negative pressure phase in the THZ, any brake fluid from the container reaching the working chambers $A_1$ and $A_2$ of the THZ via the THZ seals. It is also possible to retract all of the brake pistons of the wheel brakes RB at the same time by opening all of the control valves 107 during the negative pressure phase.

As was mentioned in the beginning, the re-feeding chambers 120 are not completely filled during normal operation, so that they may receive brake fluid volumes for lining clearance adjustment. The sensor 124 may be used to monitor the filling condition. Alternatively, it is also possible to initially completely fill the re-feeding chambers and, with the piston 103 retracted, the control valves 107 closed and the solenoids 118 opened, to open the re-feeding valves 108 for a short time, in order to allow a defined volume to escape from the re-feeding chamber. A further possibility is to completely empty the re-feeding chambers and to introduce a defined volume via the piston stroke 103. It is of advantage here if the two re-feeding chambers 120 are filled separately from one another, so that one chamber will always be full and the volume will be available for high pressure requirements.

As a result of the adjusted lining clearance, there will be a larger distance between the brake lining and the brake disc. This would interfere with a braking operation, since this causes an additional volume to be received and thus a travel loss from the piston 103. It is therefore important to re-apply the brake linings to the brake disc prior to a possible braking operation. This is referred to as pre-filling.

To this end, the brake fluid from the re-feeding chambers 120 may be used. To start with, the solenoids 118 are closed, the control valves 107 are opened and subsequently the re-feeding valves 108 are opened. The springs 110 thus displace the brake fluid via the pistons 109 from the re-feeding chambers 120 into the wheel brakes RB. The required volume may be controlled via the position of the piston 109 as supplied by the sensor 124. Alternatively, the pre-filling volume may be adjusted on the basis of the opening time of the re-feeding valves and the filling pressure of the re-feeding chambers 120. It may also be detected via the pressure sensor 112 when there is no lining clearance. As soon as the brake linings are applied to the brake disc, the pressure in the brake circuit increases. What is even more effective with regard to reducing the braking distance is pre-filling to approximately 5 bar, which, however, requires an external sensor.

A process which may be applied when, with the lining clearance adjusted, the re-feeding chambers 120 have been emptied e.g. as a result of a leak, provides the following process steps: initially the re-feeding valves 108 remain closed, the control valves 107 open. The piston 103 is actuated by the motor drive, so that volume is supplied to the brake circuits, until the brake linings are applied. Subsequently, the control valves 107 are closed and the piston 103 is moved back again. Thus, a negative pressure is generated in the working chambers A1 and A2. As soon as the piston 103 reaches its initial position, the corresponding differential volume is sucked out of the reservoir by the negative pressure.

LIST OF REFERENCE NUMERALS

1 Brake pedal
2 BKV
3 DK piston
3a SK piston
4 THZ, tandem master brake cylinder
5 Pedal travel transducer
6 Reservoir
7 Distance sensor
8 Electromotive drive of the brake power assist unit (BKV)
9 Switching valve
10 Pressure supply line.
11a-d Brake caliper
12a-d Brake piston
14 DK Travel sensor
15 Pressure transducer in the DK circuit
16 Switching valve
16a Switching valve
17 Switching valve
18 Control valve
18a Control valve
18b Control valve
18c Control valve
19 Reservoir ECU
20 Temperature transducer to HCU
21 Foot
29 Brake piston seal
30 Roll back element
31 Guiding pin
32 Magnet armature with bearing pin
33 Brake holder
34 Spreading element
35 Return pin
36 Return spring
37 Brake piston sensor
38 Suction pressure control unit
39 Auxiliary piston
40 Electric motor
41 Shaft
42 HCU (ABS, ESP)
43 Electric valve with check valve from ABS/ESP
44 HCU motor
45 HCU pump
46 Magnetic circuit with coil
52 Caliper side brake lining
59 Brake disc
BLS Brake clearance
$RB_a$-$RB_d$ Wheel brakes
101 Brake pedal
102 Motor drive with travel simulator
103 Push-rod piston DK
104 Floating piston
105 Master brake cylinder Hz
106 Reservoir
107 Control valves
108 Re-feeding valve
109 Piston
110 Spring
111 Pedal travel sensor
112 Pressure sensor
118 Solenoid
120 Re-feeding chamber
121 Inlet openings
122 Brake circuit
124 Sensor
$A_1$, $A_2$ Working chambers of the HZ
BL Brake lines
ZL Supply line

The invention claimed is:

1. A hydraulically acting brake system for a vehicle, the brake system having:
a master brake cylinder including at least one piston and at least one working chamber, wherein the at least one working chamber is connected via at least one hydraulic line to at least one wheel brake of the vehicle, wherein the at least one piston is configured to generate a negative pressure by adjustment of the piston,
a sensor configured to determine a negative pressure in the at least one hydraulic line or in the master brake cylinder, and
a controller,
wherein the at least one wheel brake includes a brake piston, and wherein, via the at least one hydraulic line, the brake piston of the at least one wheel brake is configured to be adjusted in order to generate a brake clearance,
and wherein the controller is configured to adjust a defined stroke of at least one of the pistons based on a value obtained by the sensor to achieve predefined brake clearance following the completion of a braking operation.

2. The hydraulically acting brake system as claimed in claim 1, wherein the brake system is an electro-hydraulic brake system, wherein the piston or pistons of the master brake cylinder is configured to be adjusted by means of an electric drive.

3. The hydraulically acting brake system as claimed in claim 1, wherein the brake system is a pneumatic hydraulic brake system, wherein the master brake cylinder is configured to be pneumatically adjusted.

4. The hydraulically acting brake system as claimed in claim 1, wherein the controller is further configured to adjust or control the brake clearance as a function of the driving condition and/or of the road surface condition and is configured to not control the brake clearance in the wheel brakes particularly in rainy conditions and/or when the road surface is wet.

5. The hydraulically acting brake system as claimed in claim 1, further including switching valves mounted in connection lines between a reservoir and the working chamber or working chambers of the master brake cylinder.

6. The hydraulically acting brake system as claimed in claim 1,
wherein each wheel brake has associated therewith a controlled control valve which is mounted in the hydraulic line connecting the working chamber of the brake piston cylinder system of the wheel brake with the master brake cylinder, and wherein with the control valve closed, the brake piston of a respective wheel brake is kept in its position by the enclosed hydraulic volume to maintain brake clearance in the wheel brake.

7. The hydraulically acting brake system as claimed in claim 1, wherein a unit exerts a force onto a brake caliper of a wheel brake-to adjust the brake caliper in such a way that, at the end of the braking operation, a clearance is created on the brake lining of the wheel brake which engages on a side of the brake disc which faces away from the brake piston of the wheel brake.

8. A method of using a hydraulically acting brake system having a master brake cylinder, at least one working chamber of which is connected via at least one hydraulic line to at least one wheel brake of a vehicle, wherein by means of negative pressure in the at least one hydraulic line, a brake piston of at least one wheel brake may be adjusted in order to generate a predefined brake clearance following completion of a braking operation, the method including:

closing a connection between the master brake cylinder and a reservoir by closing a switching valve; and adjusting the piston of the master brake cylinder to generate negative pressure in the hydraulic line to the at least one wheel brake or to feed a certain amount of hydraulic media from the at least one working chamber of a brake piston cylinder system of the at least one wheel brake to generate the predefined brake clearance.

9. The method as claimed in claim 8, wherein the method further includes, upon achieving the predefined brake clearance, closing a control valve associated with a respective wheel brake in order to maintain the clearance.

10. The method as claimed in claim 8, wherein brake clearance is adjusted in the individual wheel brakes successively by means of the master brake cylinder or the generator.

11. The method as claimed in claim 8, wherein the method further includes, upon adjusting the brake clearance, moving the piston of the master brake cylinder into a normal position, and switching all of the valves into the open position.

12. The method as claimed in claim 8, further including reducing the clearance in the individual wheel brakes to zero, said reducing the clearance include adjusting the brake pistons by generating a positive pressure in the hydraulic lines in such a way that a slight brake force is generated as a result of brake linings contacting one or more brake discs.

13. The method as claimed in claim 8, further including reducing to zero the clearance in the individual wheel brakes as soon as the brake system detects on the basis of driving conditions that a braking operation is imminent.

14. The method as claimed in claim 13, further including detecting an imminent initiation of a braking operation by detecting one or more of: speed of movement of an accelerator pedal, speed of a foot actuating the brake system, a distance of a foot actuating a brake pedal relative to the brake pedal, or a signal of a distance warning system.

15. The method as claimed in claim 14, wherein at least one distance sensor detects the removal of the foot from the brake pedal in at least one direction.

16. The method as claimed in claim 14, further including using a controller to detect, from a time course of a pressure signal, movement of the brake piston.

\* \* \* \* \*